(12) United States Patent
Pognant et al.

(10) Patent No.: US 11,212,131 B2
(45) Date of Patent: Dec. 28, 2021

(54) METHOD FOR CONFIGURING, MONITORING OR SUPERVISING A HOME AUTOMATION INSTALLATION

(71) Applicant: OVERKIZ, Metz-Tessi (FR)

(72) Inventors: Sylvain Pognant, Seynod (FR); Florent Pellarin, Pringy (FR)

(73) Assignee: OVERKIZ, Metz-Tessi (FR)

( * ) Notice: Subject to any disclaimer, the term of this patent is extended or adjusted under 35 U.S.C. 154(b) by 132 days.

(21) Appl. No.: 16/073,274

(22) PCT Filed: Jan. 23, 2017

(86) PCT No.: PCT/FR2017/050134
§ 371 (c)(1),
(2) Date: Jul. 26, 2018

(87) PCT Pub. No.: WO2017/129885
PCT Pub. Date: Aug. 3, 2017

(65) Prior Publication Data
US 2019/0036721 A1 Jan. 31, 2019

(30) Foreign Application Priority Data

Jan. 28, 2016 (FR) ..................................... 16/50690

(51) Int. Cl.
*H04L 12/28* (2006.01)
(52) U.S. Cl.
CPC .......... *H04L 12/281* (2013.01); *H04L 12/282* (2013.01); *H04L 12/2809* (2013.01);
(Continued)
(58) Field of Classification Search
CPC ............... H04L 12/281; H04L 12/2809; H04L 12/2818; H04L 12/282; H04L 12/2827
See application file for complete search history.

(56) References Cited

U.S. PATENT DOCUMENTS

| 2003/0061380 | A1  | 3/2003  | Saito et al. |
| 2015/0074259 | A1* | 3/2015  | Ansari ............... H04L 67/02 709/224 |
| 2017/0346905 | A1* | 11/2017 | Pognant .............. H04L 67/141 |

FOREIGN PATENT DOCUMENTS

| CN | 104038414 A   | 9/2014 |
| CN | 105245420 A   | 1/2016 |
| WO | 2009080398 A1 | 7/2009 |

OTHER PUBLICATIONS

Echonet Consortium: "-i- ECHONET Lite Specification II Echonet Lite Communication Middleware Specification", Sep. 3, 2012, pp. 1-52.
(Continued)

*Primary Examiner* — El Hadji M Sall
(74) *Attorney, Agent, or Firm* — Cantor Colburn LLP

(57) ABSTRACT

The present invention relates to a method for configuring home automation equipment, which comprises at least one It home automation device (D1, D2) likely to communicate with a central control unit (U) via at least one first local protocol (P1), the method comprising the following steps: receiving at least one configuration message relative to a location identifier (P1AD1, P1AD2) of at least one home automation device (D1, D2) according to the first local communication protocol (P1); obtaining a location identifier (P2AD1, P2AD2) of the at least one home automation device (D1, D2) according to a second target communication protocol (P2); recording (ECfU7) the correspondence between the location identifier (P1AD1, P1AD2) of the at least one home automation device (D1, D2) according to the first communication protocol and the location identifier (P2AD1, P2AD2) of the at least one home automation device (D1, D2) according to the second communication protocol (P2); recording (EcfU7) the at least one type (P2TD1, P2TD2) of the at least one home automation device (Continued)

(D1, D2) and/or the at least one definition of a function or a group of functions of the at least one home automation device (D1, D2) and/or the at least one definition of a status variable or a group of status variables of the at least one home automation device (D1, D2) and/or a function conversion rule. The present invention also relates to a method for controlling and monitoring said equipment.

11 Claims, 7 Drawing Sheets

(52) U.S. Cl.
CPC ...... *H04L 12/2818* (2013.01); *H04L 12/2827* (2013.01); *H04L 12/2836* (2013.01)

(56) References Cited

OTHER PUBLICATIONS

International Search Report for Application No. PCT/FR2017/050134.
Written Opinion for Application No. PCT/FR2017/050134.
English Translation First Office Action for Application No. 201780020699.X.
First Office Action for Application No. 201780020699.X.
First Search for Application No. 201780020699.X.

* cited by examiner

| P1F | P2F |
|---|---|
| P1T | P2T |
| P1S | P2S |

Fig. 5

| P1A | P1S/P1F/P1T | P2A | P2S/P2F/P2T |
|---|---|---|---|
| P1AD1 | P1S1D1/ P1S1F1 | P2AD1 | P2S1D1/ P2S1F1 |
| P1AD1 | P1S2D1 / P1S2F2 | P2AD1 | P2S2D1 / P2S2F2 |
| P1AD2 | P1S1D2 / P1S1F2 | P2AD2 | P2S1D2 / P2S1F2 |
| P1AD2 | P1S2D2 / P1S2F2 | P2AD2 | P2S2D2 / P2S2F2 |
| P1AD1 | P1TD1 | P2AD1 | P2TD1 |

Fig. 6

METHOD FOR CONFIGURING, MONITORING OR SUPERVISING A HOME AUTOMATION INSTALLATION

CROSS REFERENCE TO RELATED APPLICATIONS

This application is a National Stage of PCT Application No. PCT/FR2017/050134 filed on Jan. 23, 2017, which claims priority to French Patent Application No. 16/50690 filed on Jan. 28, 2016, the contents each of which are incorporated herein by reference thereto.

FIELD OF THE INVENTION

The present invention concerns a configuration method, a discovery method and a monitoring or supervision method of a home automation installation.

PRIOR ART

A home automation installation of a building may comprise a plurality of home automation devices. It is known to proceed with the configuration, and with the monitoring, that is to say with the control and/or the supervision of said installation using a central control unit which communicates with one or several home automation device(s).

In such an installation, some home automation devices communicate according to a first protocol type, in particular a home automation protocol type local protocol, for example a proprietary protocol which does not uses an IP addressing.

Other equipment or other home automation devices within the same installation may communicate according to target communication protocols of a second type, in particular in a communication protocol on top of the IP protocol, or a generic point-to-point protocol, for example Bluetooth.

The presence of different communication protocols does not enable an easy communication between the devices or requires providing for the implementation of several communication protocols on the devices and equipment in order to enable their communication, which increases the cost and/or the complexity of the programming thereof.

The present invention aims to solve all or part of the aforementioned drawbacks.

DISCLOSURE OF THE INVENTION

To this end, the present invention concerns a configuration method of a home automation installation comprising at least one home automation device and at least one central control unit, the at least one home automation device being prone to communicate with the central control unit via at least one local first protocol; the method being executed by the at least one central control unit and comprising the following steps:

Reception of at least one configuration message relating to a location identifier of at last one home automation device according to the local first communication protocol and to:
a type of the at least one home automation device; and/or
at least one definition of a function or of a group of functions of the at least one home automation device according to said first communication protocol; and/or
at least one definition of a state variable or of a group of state variables of the at least one home automation device according to said first communication protocol;

Obtainment of a location identifier of the at least one home automation device according to a target second communication protocol;
Registration of the correspondence between the location identifier of the at least one home automation device according to the first communication protocol and the location identifier of the at least one home automation device according to the second communication protocol;
Registration of the at least one type of the at least one home automation device; and/or of the at least one definition of a function or of a group of functions of the at least one home automation device and/or of the at least one definition of a state variable or of a group of state variables of the at least one home automation device; and/or of a function conversion rule arranged to convert the definition of the at least one function or group of functions according to the first communication protocol into at least one definition of a function or of a group of functions according to the target second communication protocol and/or of a state conversion rule arranged to convert the definition of the at least one state variable according to the first communication protocol into at least one definition of a state variable according to the target second communication protocol.

Thanks to the arrangements according to the invention, it is possible to set up a publication of a location identifier, according to the target second communication protocol for home automation devices that can communicate only according to a local or proprietary first protocol, without having to make changes on this at least one device, and thus link this at least one device with other nodes of a network defined according to the second communication protocol.

Once the steps of the configuration method are completed, the home automation device is virtualized. The central control unit can act on behalf of the home automation device on the network according to the second communication protocol.

Thus, it is possible to present functions/commands or state variables of the at least one device for a monitoring according to the second protocol. The functions/commands may be translated between the first communication protocol and the second communication protocol by the conversion rules. As example, in a io-Homecontrol type first protocol, for piloting the motorization of a rolling shutter or sunshade type home automation device, commands corresponding to raise and descend type actions are defined, whereas in a second protocol on top of the IP protocol, only the open and closed statuses may be presented.

The definition of the at least one function or of the at least one state variable may be explicit or determined from at least one definition of a type according to said first communication protocol of the at least one home automation device which may be determined from the configuration message or from a known group of functions depending on the considered protocol («function cluster»).

According to one possibility, each home automation device is identified by a location identifier, as if it was able to ensure a communication on its own. Hence, several distinct devices have distinct location identifiers according to the second protocol. The central control unit receives the messages addressed to these identifiers and is capable of ensuring the processing and/or the routing thereof up to the device, by using the conversion rules so as to communicate a converted message according to the local first protocol.

According to another possibility, a group of devices is identified by the same identifier according to the second protocol. These arrangements allow considering a configuration of a group of devices controllable as one single device, effectively by one single function call.

According to one variant, the method comprises a plurality of correspondences between a device communicating according to the first communication protocol and location identifiers according to several second control methods. These arrangements allow virtualizing the device in order to make it communicate according to several target second protocols.

According to one variant, the central control unit sends a subscription message to a home automation device in order to subscribe to notifications relating to at least one state variable of at least one home automation device. Thus, notifications regarding the state variables will be communicated to the central control unit in the context of a supervision method.

In the context of the present invention, a local first protocol is a local communication protocol, in particular a non-IP local protocol, for example a home automation protocol, in particular a proprietary-type home automation protocol. There may be several local protocols. As example, the RTS or io-Homecontrol protocols may constitute a local first protocol.

In the context of the present invention, a target second protocol is for example a communication protocol on top of the IP protocol on a local area network or a generic protocol enabling a point-to-point communication. As example, the WEAVE application protocol using 6lowpan and thread transport protocols for a mesh network may constitute a target second protocol.

According to an aspect of the invention, the target second protocol is a protocol on top of the IP protocol.

In the context of the present invention, a transport network is a network for linking at least one device and the central control unit by the second protocol. This network enables transport and addressing.

In the context of the present invention, a node is an equipment present on a network using the second communication protocol which possesses a unique location identifier on the considered network, corresponding for example to the home automation installation.

In the context of the present invention, a location identifier is a unique identifier in the considered local area network, corresponding for example to the home automation installation. In the case of the local first communication protocol, it is particularly possible to use an address in a proprietary format corresponding to the used home automation protocol. In the case of the target second protocol, a location identifier may be in particular a network address, such as for example an IPv4 or IPv6 address or a Bluetooth address, or still a composition of a network address and of a resource identifier indicated by an access path, for example in the form of the following URL:

<protocol>://<host address>[:<port>]/<resource path>

In the context of the present invention, a home automation device is a home automation equipment and/or a sensor, or still a portion of a home automation equipment or a portion of a sensor corresponding to a functional subset. A home automation device may also correspond to a control point of other home automation devices.

In the context of the present invention, a message is an information element notified or received via a communication module from an external equipment, or in the form of a synchronous or asynchronous call, which may also correspond to a local or remote function call.

In the context of the present invention, an installation is a set comprising a plurality of home automation devices and at least one central control unit disposed on one single building or on a plurality of locations, each home automation device being related to a central control unit among the plurality of central control units, the plurality of central control units forming a group under the control of one user. The electronic devices form groups of at least one home automation device related to a central control unit.

In the context of the present invention, a central control unit of the home automation installation is an electronic unit comprising:
  at least one processing unit for containing and executing at least one computer program,
  at least one communication module intended to monitor and/or control at least one home automation device; alternatively the electronic unit may be integrated to a home automation device; and
  at least one module for communication with the management unit.

In some applications, a central control unit may communicate with the management unit through an intermediate management unit, for example a third-party service provider, whose intermediate management unit provides a service interface or API.

The central control unit may also be integrated to a router and/or a modem achieving a connection to a wide area network, in particular the Internet.

In the context of the present invention, a state variable is an element describing the state of a home automation device. The value of a state variable may correspond to the ON/OFF condition for a switch, or to an opening degree or percentage for a shutter. Moreover, a state variable may correspond to a measurement value of a sensor, for example a value of a physical or environmental quantity. The description of the states of the devices may be generic or specific, depending on the local protocol. The identifiers of the state variables may be numeric or alphanumeric. The values of the state variables may use formats or scales which are customized or proprietary.

In the context of the present invention, a command/function corresponds to an order that may be given to a home automation device in order to carry out an action by this device or to obtain an information feedback, for example an information relating to a state variable of this device.

According to one possibility, the method comprises a plurality of steps of receiving configuration messages corresponding to a plurality of first communication protocols.

According to one possibility, the method comprises a plurality of steps of emitting discovery messages according to a plurality of first communication protocols.

According to an implementation, the step of obtaining the location identifier corresponds to a reception of an input by the user of a location identifier according to the second communication protocol.

According to an implementation, the step of receiving a configuration message comprises a declaration by the user of the location identifier according to the first communication protocol and/or a declaration by the user of at least one function or of a device type according to the first communication protocol.

According to an implementation, the method further comprises the following step:

Obtainment of at least one function conversion rule arranged to convert the definition of the at least one function according to the first communication protocol into at least one definition of a function according to the target second communication protocol and/or of a state conversion rule arranged to convert the definition of the at least one state variable according to the first communication protocol into at least one definition of a state variable according to the target second communication protocol, Registration of the at least one function conversion rule and/or of the at least one state conversion rule.

According to an embodiment, the obtainment step comprises a step of downloading conversion rules originating from a server or from a remote management unit.

According to an aspect of the invention, the download step may intervene when the concerned at least one conversion rule is not locally available on the central control unit.

According to an implementation, the method further comprises the following step:

definition of an action to carry out at least partially by the central control unit in correspondence with a function according to the second protocol corresponding to a location identifier.

These arrangements allow proceeding with a function addition or with a function simulation, when the home automation device corresponding to the considered identifier cannot provide the requested command.

According to an implementation, the conversion step comprises the restriction of the requested function or the banning of a command/function to be carried out.

These arrangements allow performing, in particular during the conversion, a limitation of the ranges of command values or preventing the completion of some commands. These arrangements are implemented at the level of the central control unit, without requiring any modification at the level of the equipment.

According to an aspect of the invention, the configuration method may be triggered by the reception of a message received by the central control unit originating from a user terminal.

According to one variant, a press on a button of the central control unit may also enable the triggering of the method. Alternatively or complementarily, an action on a home automation device, such as a press on a button may be considered for triggering of the method.

The present invention also concerns a discovery method of a home automation installation comprising at least one home automation device and at least one central control unit, the at least one home automation device being prone to communicate with the central control unit via at least one local first protocol; the method being executed by the at least one central control unit and comprising the following steps:

Sending at least one compliance announcement or description message according to a target second communication protocol in connection with:

at least one location identifier of the at least one home automation device; the location identifier of the at least one home automation device according to the first communication protocol corresponding to the location identifier of the at least one home automation device according to the second communication protocol; and optionally, a type of the at least one home automation device or at least one description of a function or of a group of functions according to the second communication protocol and/or at least one description of a state variable or of a group of state variables of the at least one home automation device according to the second communication protocol.

The compliance announcement message may also be considered as an existence declaration message.

According to one possibility, the at least one compliance announcement message and the at least one description message may be combined.

According to one possibility, sending of the description message follows the reception of a discovery message.

According to an aspect of the invention, the discovery method comprises a step of receiving at least one discovery message originating from a node communicating according to a second communication protocol.

According to one variant, the central control unit may periodically check-up the availability of the home automation devices and send description and/or existence declaration messages only in case of availability of the concerned home automation device.

The present invention also concerns a control method of a home automation installation comprising at least one home automation device and at least one central control unit, the at least one home automation device being prone to communicate with the central control unit via at least one local first protocol; the method being executed by the at least one central control unit and comprising the following steps:

Reception of at least one control message originating from a node communicating according to a second communication protocol comprising at least one location identifier of a home automation device according to the target second communication protocol and at least one definition of a function of the home automation device according to the second communication protocol;

Determination of a location identifier of the at least one home automation device according to the first communication protocol corresponding to the location identifier of the at least one home automation device according to the second communication protocol;

Application of a function conversion rule arranged to convert the definition of the at least one function according to the target second communication protocol into at least one definition of a function according to the local first communication protocol;

Sending at least one control message to the at least one home automation device corresponding to the location identifier and to the function according to the local first communication protocol.

According to an aspect of the invention, the step of applying a conversion rule may comprise the completion of processing steps complementary to the command call, in particular if a portion of the function cannot be carried out on the home automation device, and in particular a partial enrichment of the function As example, a planning of a command may be provided if the device itself does not enable such a planning. Thus, it is possible to implement on the central control unit a «Calendar Weave» type function in order to trigger an opening command on Monday at 8.00 AM for an awning-type home automation device.

Also as example, a parameter conversion may be carried out by the central control unit.

According to an aspect of the invention, prior to the step of receiving a control message, a connection may be established between a node communicating according to the second communication protocol and the central control unit.

Thus, the central control unit acts on the communication network according to the second communication protocol as a virtual representative of the home automation devices communicating according to the local first communication protocol.

According to an aspect of the invention, the control method further comprises the following steps:
- Reception of at least one control feedback message originating from the at least one home automation device according to the local first communication protocol;
- Application of a function conversion rule in order to convert a control feedback information expressed according to the local first communication protocol into a control feedback information expressed according to the target second communication protocol;
- Sending at least one control feedback message to the at least one node communicating according to a second communication protocol, the control feedback message comprising a control feedback information according to the target second communication protocol.

The present invention also concerns a supervision method of a home automation installation comprising at least one home automation device and at least one central control unit, the at least one home automation device being prone to communicate with the central control unit via at least one local first protocol; the method being executed by the at least one central control unit and comprising the following steps:
- Reception of a supervision message originating from a home automation device comprising an information relating to a value of at least one state variable of the at least one home automation device according to said first communication protocol;
- Application of a state conversion rule in order to convert the at least one information relating to a value of at least one state variable of the at least one home automation device expressed according to the local first communication protocol into a value of at least one state variable of the at least one home automation device expressed according to the target second communication protocol;
- Adaptation of the location identifier of the at least one home automation device according to the first communication protocol into a location identifier of the at least one home automation device according to the second communication protocol;
- Sending at least one supervision message to at least one node communicating according to a second communication protocol, the supervision message comprising an information relating to a value of at least one state variable of the at least one home automation device according to the target second communication protocol and in connection with the location identifier of the at least one home automation device according to the second communication protocol.

According to an aspect of the invention, the steps of applying a conversion rule and of address adaptation may be carried out sequentially in any order or simultaneously.

According to one possibility, sending of the supervision message may be carried out on the initiative of the central control unit spontaneously or upon reception of a supervision message originating from a home automation device.

According to another possibility, the supervision message may be sent upon reception by the central control unit of a request message originating from a node communicating according to the second communication protocol. According to this second possibility, the central control unit comprises a space or base for storing the values of state variables for the home automation devices related thereto.

According to one variant, the central control units periodically consults the values of state variables of the home automation devices, detects the modifications on the values of state variables by comparing a last obtained value and at least one value already stored. In case of a modification, the central unit sends a supervision message relating to the modified variable state value to at least one node communicating according to the second communication protocol.

These arrangements allow implementing an event-based emulation for a device that does not offer such a feature.

According to an aspect of the invention, the sending step is carried out to at least one node registered in a subscription list to an event relating to the at least one state variable.

According to one variant, the sending step may be indifferently carried out to a set of nodes present on the network communicating according to the second communication protocol. This arrangement corresponds to a mode called «Broadcast» mode.

According to an aspect of the invention, the method comprises a step of sending to a home automation device a request for registration in a subscription list to an event relating to the at least one state variable of the home automation device.

Thanks to these arrangements, the home automation device sends a supervision message only to the nodes subscribed on the network established according to the first communication protocol, and in particular to the central control unit.

According to one variant, the home automation device may send the supervision messages indifferently to a set of nodes present on the network communicating according to the first communication protocol. This arrangement corresponds to a mode called «Broadcast» mode.

The different non-incompatible aspects defined hereinabove may be combined.

BRIEF DESCRIPTION OF THE FIGURES

The invention will be better understood from the detailed description which is exposed hereinafter with reference to the appended drawing in which:

FIG. 5 is a table of correspondence between functions, groups of functions, state variables, groups of state variables or types expressed according to the local first communication protocol and functions, groups of functions, state variables, groups of state variables or types expressed according to the target second communication protocol.

FIG. 6 is a table of nodes identifying the relationships between location identifiers expressed according to the local first communication protocol and location identifiers expressed according to the target second communication protocol.

DESCRIPTION WITH REFERENCE TO THE FIGURES

In the following detailed description of the figures defined hereinabove, the same elements or the elements filling identical functions may keep the same references so as to simplify the understanding of the invention.

Description of a System Comprising a Home Automation Installation

Figure 1:
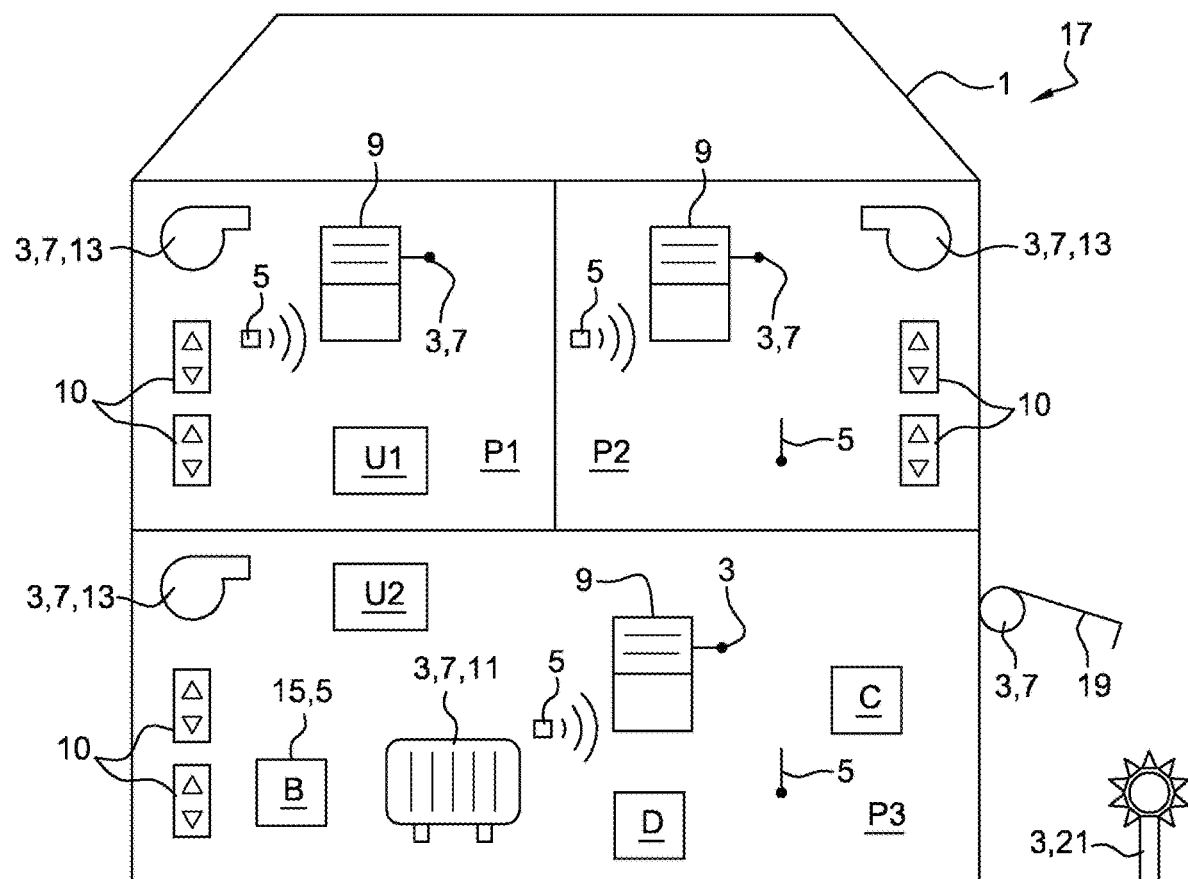
FIG. 1 is a schematic view of a building and of a home automation installation in accordance with an embodiment of the invention.

As illustrated in FIG. 1, a building 1 comprises for example three rooms P1, P2, P3. The building 4 also comprises home automation equipment 3 and sensors 5.

A home automation equipment 3 may consist of an actuator arranged to displace or set an element of the building 1, for example an actuator 7 for displacing a rolling shutter 9 or a terrace awning 19, or a regulation system 10 for a heater 11 or a ventilation system 13. A home automation equipment 3 may also consist of a lighting, for example a terrace external lighting 21 or a lighting control system, an alarm system, or still a video camera, in particular a video-surveillance camera.

The home automation installation 17 may also comprise a control point 15 an actuator 7, such as a wireless control box B for the rolling shutter 9.

The home automation installation 17 may comprise one or several sensor(s) 5, integrated to an actuator 7, to a control point 15 or to the control box B or independently of these elements. In particular, a sensor 5 may be arranged to measure a physical unit, for example a temperature sensor, an insolation sensor or a humidity sensor. Position sensors 5 of home automation equipment 3 of the building 1, such as, for example, sensors of the open state of a rolling shutter 9 or sensors of the position of a door leaf such as a window, whether motorized or not, may also be provided. The home automation installation may also comprise one or several presence sensor(s).

A home automation equipment 3 and a sensor 5 should thus be considered as units having information on observed actual states of elements of the building 1 and being capable of sharing this information with other elements of the home automation installation 17.

The home automation equipment 3 and the sensors 5 can thus have access to any measurable physical unit, such as the temperature of each room P1, P2, P3 or a state of an element of the building 1, such as the open state of a rolling shutter 9, the state of an alarm, etc.

In the following, we will use the home automation device or device D indifferently to designate sensors or home automation equipment, or parts of home automation equipment 3 or sensors 5.

The home automation installation 17 comprises a plurality of central control units U1, U2. In particular and as example, two central control units U1, U2 are represented in FIG. 1. According to one variant, a home automation installation may also comprise one single central control unit.

Each central control unit U1, U2 is arranged to control and/or monitor part of the devices D of the installation 17 forming a group DGrU1, DGrU2. As example, in FIG. 1, the central control unit U1 is in charge of the devices D disposed in the rooms P1 and P2 of the first floor of the building, whereas the central control unit U2 is in charge of the devices D disposed in the room P3 on the ground floor of the building and the external devices.

In particular, the control and/or monitoring is carried out remotely, in particular using a wireless communication protocol, for example a radio communication protocol. Each central control unit U1, U2 is arranged to group together all data originating from the devices D of its group DGrU1, DGuU2 and to process these data.

Figure 2:
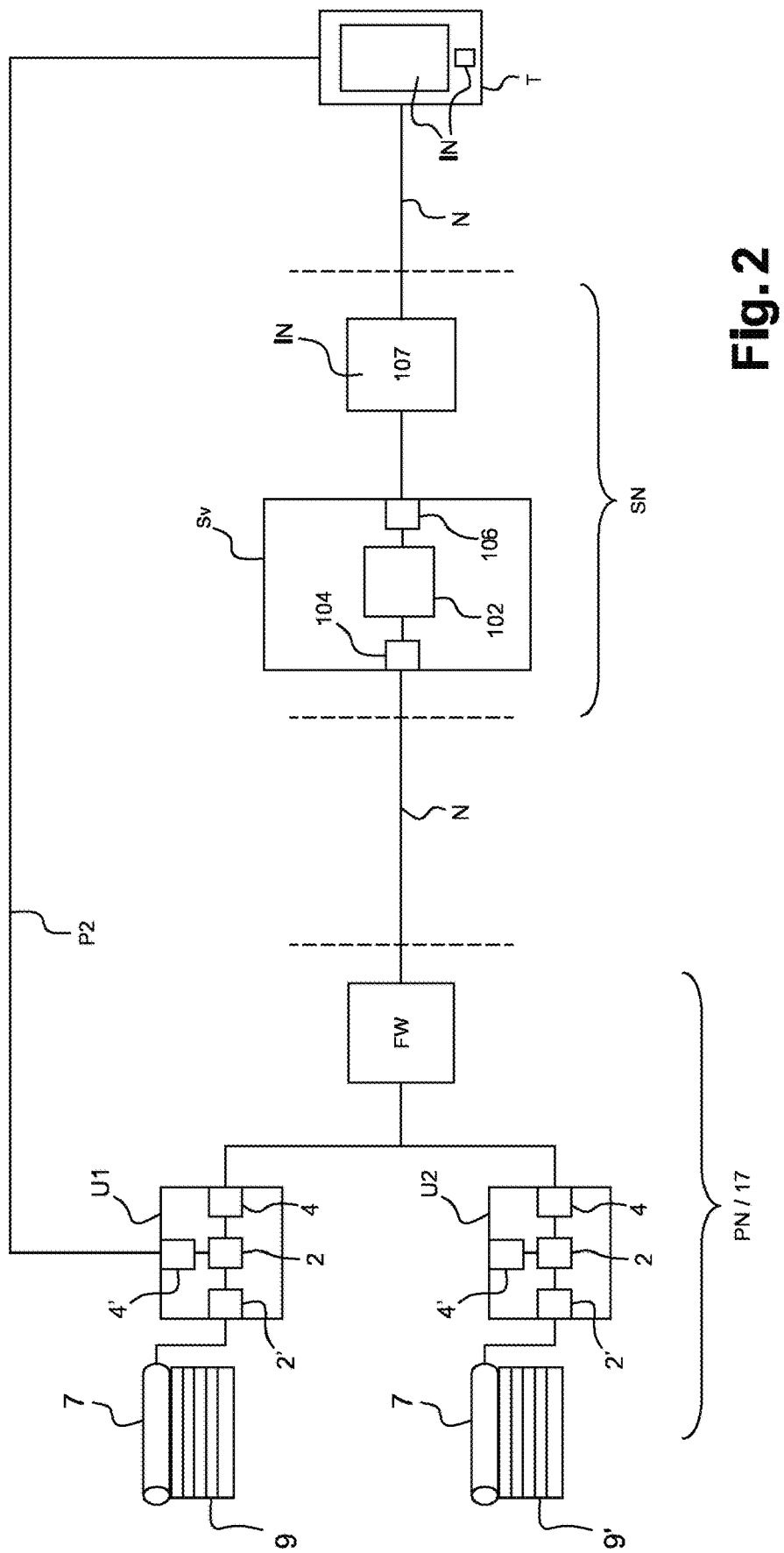
FIG. 2 is a diagram presenting an architecture of a system comprising the home automation installation illustrated in FIG. 1, a second home automation installation, as well as a server intended to be connected to a user terminal.

As represented in FIG. 2, each central control unit U is arranged to communicate with a server Sv.

The central control units U1, U2, U3 are disposed on a private network PN, whose access is generally protected by a firewall FW. The server Sv is also disposed on a private network SN. The private network PN is linked to a wide area network N, for example the Internet. Of course, the server Sv is arranged to communicate with a set of such central control units U. We will describe in the following one of these units.

A central control unit U comprises a processing unit 2 arranged to contain and execute a first computer program. As example, the processing unit 2 comprises a processor, a storage flash memory as well as a random access memory, and an Ethernet chip.

The central control unit U further comprises at least one communication module 2' intended to monitor and/or control home automation equipment 3 and/or sensors 5, the home automation equipment 3 may consist of actuators 7, lightings 21, an alarm system, or a video camera.

As example, as represented in FIG. 2, the communication module 2' enables the monitoring and control of at least one actuator 7, a movable element of the building 1, such as for example a rolling shutter 9, or an orientable sunshade 9' or other actuators 7 or lightings 21, as previously described with reference to FIG. 1, according to the local first communication protocol P1.

As example, the communication module 2' may be arranged to implement for example one or more of the local first protocols P1 such as for example Z-Wave, EnOcean, io-Homecontrol, Somfy RTS, KNX, MODBUS, Wavenis, Philips HUE. In general, these local first protocols are non-IP local communication protocols.

According to another possibility, for example in the context of alarm systems, the central control unit may be integrated into the home automation device. According to still another possibility, the central control unit may also be integrated to a router and/or a modem achieving a connection to a wide area network, in particular the Internet.

There is also provided the reception of information from a sensor 5 providing information on the presence of a user or values of the surrounding parameters such as temperature, humidity and luminosity. In the same manner, the central unit U may enable the monitoring and/or control of an alarm system.

Each central control unit U further comprises a communication module 4' for communicating according to a target second communication protocol P2, with a mobile communication terminal T. For example, the target second communication protocol may be a communication protocol on top of the IP protocol on a local area network, or still a generic point-to-point protocol. As example, the WEAVE application protocol using 6lowpan and thread transport protocols for a mesh network may constitute a target second protocol. Other examples include Bluetooth, Zigbee or Wifi.

The communication terminal T may contain and execute an application software APP.

Each central control unit U further comprises a module 4 for communicating with the server Sv. The server Sv enables the remote control and/or monitoring and comprises one or several processing unit(s) 102 arranged to contain and execute a second computer program.

In some applications, a central control unit U may communicate with the server Sv through an intermediate server, for example a third-party service provider, whose intermediate server provides a service interface or API. In turn, the server Sv comprises at least one communication interface 104 intended for the communication with the central unit U.

The server Sv may also comprise a communication interface 106 intended for the communication with a control and/or monitoring interface IN enabling a user to remotely monitor the home automation installation.

It should be noted that the term server is a logical designation which may cover the use of several physical servers to distribute the computer processing load to be carried out.

For example, the control and/or monitoring interface IN comprises a web server 107 and a mobile communication terminal T communicating via the wide area network N. For example, the mobile communication terminal T may consist of a smartphone or a tablet. The mobile communication terminal T may be the same or a terminal of the same type as that with which the central control unit U communicates locally by means of the communication module 4' according to the second protocol P2 as we will detail later on, or a different terminal. We will designate these mobile terminals indifferently by the reference T.

The control and/or monitoring interface IN comprises a processor which may be disposed at the level of the web server 107 and/or the mobile communication terminal T.

The processor of the control and/or monitoring interface IN is arranged to use a third computer program. In turn, this third computer program is arranged to execute a downloadable application.

The mobile communication terminal T comprises a data input device and a display device, for example in the form of a tactile control portion of a screen of the terminal T and in the form of one or several button(s) of the terminal T.

FIGS. 1 and 2 describe an installation 17 which comprises a set of devices D and a plurality of central control units U1, U2, disposed within the same dwelling, the same building or the same physical location.

Network Corresponding to the Local Protocol and to the Target Protocol

Figure 3:
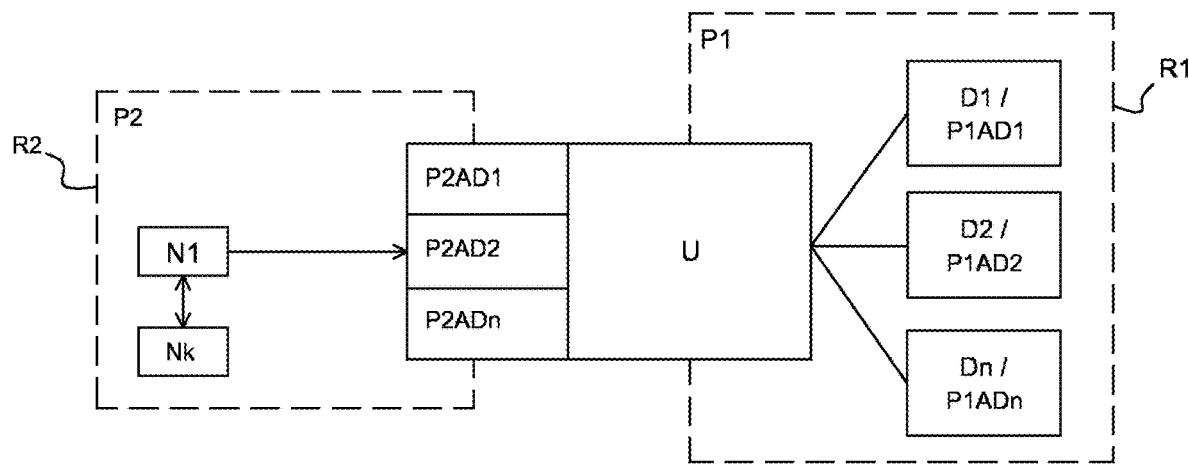
FIG. 3 is a diagram representing the relationships between a central control unit, devices of the home automation installation communicating according to a local first communication protocol and network nodes communicating according to a target second protocol.

As shown in FIG. 3, the devices D1, D2, Dn parts of a group DGrU belong to a local area network R1 managed by a central control unit U within the home automation installation and communicate according to a local first communication protocol P1 with the central control unit U. The devices D1, D2, Dn have a location identifier constituted by a local address P1AD1, P1AD2, P1ADn in this network. The logical devices D1, D2, Dn may be modelled as nodes or end points in the local area network.

Other home automation devices, user terminals T or control points may be present in the installation and be modelled by nodes N of a second network R2 and communicate according to a target second communication protocol P2, in particular according to a protocol using the IP protocol. By node, is meant an equipment present on a network R2 using the second communication protocol P2 and which possesses a unique location identifier on the network R2.

The central unit U is arranged to present to the nodes N1, Nk of the network R2 communicating according to the network R2 a set of location identifiers P2AD1, P2AD2, P2ADn according to the target second communication protocol P2 for the devices communicating according to the local first communication protocol P1 and may provide an interface for discovering the home automation devices D1, D2, Dn detailing the type, the functions and/or the state variables of the devices, according to the second communication protocol P2.

Configuration Method

First Implementation

Figure 4:
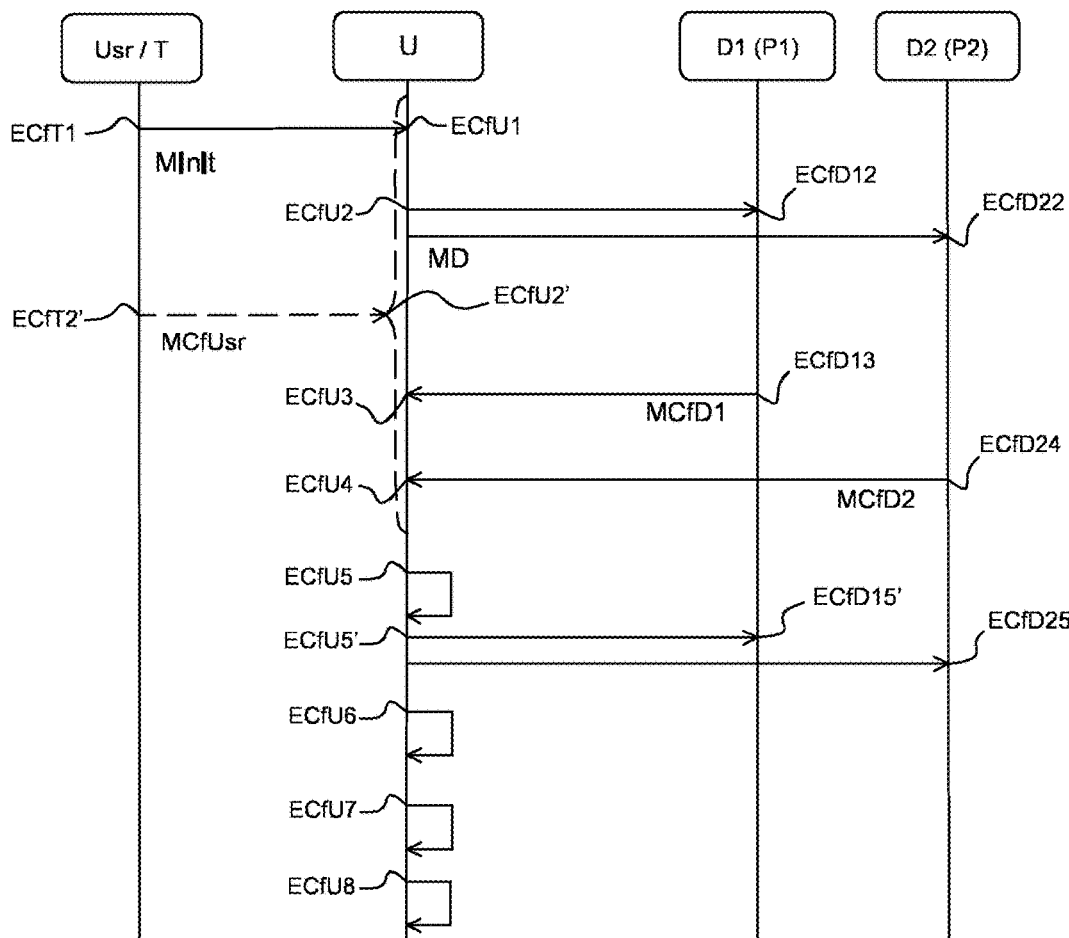
FIG. 4 is a diagram illustrating an implementation of a configuration method of a home automation installation according to the invention.

We will now describe a first embodiment of a configuration method of a home automation installation 17 with reference to FIG. 4, so as to obtain the configuration represented in FIG. 3, the method being executed by the central control unit U. Only two home automation devices D1, D2 communicating according to the local first communication protocol P1 are represented in FIG. 4. Nonetheless, one single home automation device or more than two home automation devices may also be considered.

At a first step EcfU1, the configuration method may be triggered by the reception of a message MInit received by the central control unit U originating from a user terminal Usr/T which emits it at a step EcfT1. According to one variant, a press on a button of the central control unit U may also enable the triggering of the method. Alternatively or complementarily, an action on a home automation device, such as a press on a button may be considered.

At a step ECfU2, the central control unit U emits discovery messages MD to the home automation devices D1, D2 according to the first communication protocol P1, which receive this message MD respectively at steps EcfD12 or ECfD22.

At steps EcfU3, EcfU4, the central control unit U receives configuration messages MCfD1, MCfD2 originating from the home automation devices D1, D2 which emit these messages respectively at steps ECfD12 and ECfD22.

Each of these configuration messages MCfD1, MCfD2 relates to a location identifier P1AD1, P1AD2 of a home automation device D1, D2 according to the local first communication protocol P1 and to:
- a type P2TD1, P2TD2 of the at least one home automation device D1, D2; and/or
- at least one definition of a function P1F1D1, P1F2D1, P1F1D2, P1F2D2 or a group of functions of the at least one home automation device D1, D2 according to said first communication protocol P1 and/or
- at least one definition of a state variable P1S1D1, P1S2D1, P1S1D2, P1S2D2 or a group of state variables of the at least one home automation device D1, D2 according to said first communication protocol P1.

At a step EcfU5, the central control unit U obtains a location identifier P2AD1, P2AD2 for each home automation device D1, D2 according to a target second communication protocol P2. The methods for obtaining the location identifier may be multiple and are detailed later on.

At a step Ecf6, the control unit can proceed with a check-up of the existence of at least one function conversion rule RCFX arranged to convert the definition of the at least one function P1F1D1, P1F2D1, P1F1D2, P1F2D2 according to the first communication protocol P1 into at least one definition of a function P2F1D1, P2F2D1, P2F1D2, P2F2D2 according to the target second communication protocol P2 and/or of a state conversion rule RCSX arranged to convert the definition of the at least one variable state P1S1D1, P1S2D1, P1S1D2, P1S2D2 according to the first communication protocol P1 into at least one definition of a state variable P2S1D1, P2S2D1, P2S1D2, P2S2D2 according to the target second communication protocol P2.

This check-up may be based on the device type P2TD1, P2TD2, or on the definitions of functions, groups of functions and/or on the definitions of state variables or groups of state variables. Indeed, depending on the used protocols, a type may be sufficient to identify the supported functions or state variables, such as for example in the io-Homecontrol protocol, or functions or groups of functions or variables or groups of state variables should be listed, such as for example in the Zwave protocol.

Alternatively, the central control unit U may identify a correspondence between a type P1TD1, P1TD2 of a home automation device according to the local first communication protocol P1 and a type P2TD1, P2TD2 of a home automation device according to a local second communication protocol P2.

The conversion rules may be stored in one or several correspondence tables, comprised within a knowledge base.

In the case where such a conversion rule is not available, the central control unit may proceed with its obtainment, for example by proceeding with a download from the Server Sv. Next, the conversion rule(s) may be registered at a step EcfU6.

The setup of the conversion of a function may also comprise a step of defining an action to carry out at least partially by the central control unit in correspondence with a function according to the second protocol corresponding to a location identifier, or still the restriction of the requested function or the banning of a function to be carried out. Alternatively, the corresponding definitions may be pre-defined in the correspondence table or knowledge base.

Alternatively, the conversion of the functions or state variables may be implemented in the context of the control and/or supervision method.

Examples of conversion or partial completion by the central control unit are given later on in the context of the description of the control or supervision method.

At a step EcfU7, the central control unit U registers the correspondence between the location identifier P1AD1, P1AD2 of the at least one home automation device D1, D2 according to the first communication protocol and the location identifier P2AD1, P2AD2 of the at least one home automation device D1, D2 according to the second communication protocol P2 in a nodes table illustrated in FIG. 6.

At a step EcfU8, the central unit U also registers in the nodes table:
 the at least one type P2TD1, P2TD2 of the at least one home automation device D1, D2; and/or
 the at least one definition of a function P1F1D1, P1F2D1, P1F1D2, P1F2D2 or of a group of functions of the at least one home automation device D1, D2 and/or the at least one definition of a state variable P1S1D1, P1S2D1, P1S1D2, P1S2D2 or of a group of state variables of the at least one home automation device D1, D2; and/or
 a function conversion rule RCFX arranged to convert the definition of the at least one function P1F1D1, P1F2D1, P1F1D2, P1F2D2 or group of functions according to the first communication protocol P1 into at least one definition of a function P2F1D1, P2F2D1, P2F1D2, P2F2D2 or of a group of functions according to the target second communication protocol P2; and/or
 a state conversion rule RCSX arranged to convert the definition of the at least one state variable P1S1D1, P1S2D1, P1S1D2, P1S2D2 according to the first communication protocol P1 into at least one definition of a state variable P2S1D1, P2S2D1, P2S1D2, P2S2D2 according to the target second communication protocol P2.

Once the steps of the configuration method are completed, the home automation device D1 is virtualized. The central control Unit U can act on behalf of D1 on the network R2.

Variants

According to one variant, a group of devices may be identified by the same location identifier according to the second protocol. In this case, the correspondence table comprises several location identifiers according to the first communication protocol which correspond to the same location identifier according to the second communication protocol. These arrangements allow considering a configuration of a group of devices controllable as one single device, effectively by one single function call.

According to one variant, the method comprises a plurality of steps of receiving configuration messages corresponding to a plurality of first communication protocols.

According to one variant, the method comprises a plurality of steps of emitting discovery messages according to a plurality of first communication protocols.

According to one variant, the method comprises a plurality of correspondences between a device communicating according to the first communication protocol and location identifiers according to several second control methods. For example, the target second communication protocols may be the Weave/thread and Bluetooth methods.

According to one variant, depending on the considered first communication protocol P1, it may be necessary for the central control unit U to send a subscription message MI at a step ECfU5' in order to subscribe to notifications relating to at least one state variable of at least one home automation device D1, D2, the home automation devices receiving this message respectively at steps EcfD15', EcfD25'. Thus, notifications regarding the state variables will be communicated to the central control unit in the context of a supervision method.

Obtainment of a Location Identifier According to the Target Second Communication Protocol Obtainment of a location identifier according to the target second communication protocol, that is to say a unique identifier in the considered local area network, will now be described according to two implementations.

In the case of the local first communication protocol, it is particularly possible to use, as a location identifier, an address in a proprietary format corresponding to the used home automation protocol.

In the case of the target second protocol, a location identifier may in particular consist of a network address, such as for example an IPv4 or IPv6 address or a Bluetooth address, or still a composition of a network address and of a resource identifier indicated by an access path, for example in the form of the following URL:

<protocol>://<host address>[:<port>]/<resource path>

We describe hereinbelow two implementations in which the location identifier corresponds respectively to a network address or to a combination of a network address and of a resource.

According to a first implementation, the target second communication protocol involves the use of distinct network addresses for the home automation devices. In this case, the location identifier corresponds to a network address.

According to a first possibility, the network address is equal to, or contains the physical address of the device, such as for example in the case of a Bluetooth or IPv6 Link-local protocol. In this case, at a first step, the central control unit U determines a unique physical address for the device D1 to emulate.

According to a first example, in the case of a protocol based on the IP protocol, the central control unit U may choose a MAC address within a range acquired beforehand with the IEEE registration organism, the address corresponding to a composition:

Company_id+free suffix

Wherein:
company_id corresponds to a manufacturer identifier for example over 3 bytes;
free suffix, corresponds to a unique identifier of the device D1 on the network R2, for example over 3 bytes. For a central control unit U that can emulate up to 255 home automation devices, all it needs in this case is to vary the last byte in order to identify the home automation devices D.

According to a second example corresponding to an emulation according to the Bluetooth protocol, it is also possible to choose an address within a range acquired beforehand as previously described for the MAC address in the context of an IP protocol. In the same manner, for a central control unit U that can emulate up to 255 home automation devices, all it needs is to vary the last byte in order to identify the home automation devices D.

According to a second step, the central control unit U determines a unique network address from the physical address.

According to some target second protocols P2, the network address corresponds to the physical address, for example in the Bluetooth protocol. According to other target second protocols P2, the network address is obtained by applying an injective transformation from the physical address, such as for example in the case of the IPv6 Link-local protocol, in which the network address is constructed from the MAC address.

According to a second possibility, the network address is obtained from a network controller on presentation of a physical address. As example, this may be the case in a protocol on top of IP.

According to this second possibility, at a first step, the central control unit U determines a unique physical address for the device D1 to emulate, in the same manner as with the aforementioned first possibility. At a second step, the central control unit U obtains a unique network address on the network R2 with a network controller from the physical address. As example, the network controller may be a DHCP Server for IPv4 or IPv6.

According to a second implementation, the network address may be shared for several home automation devices D1, D2. In this case, the location identifier corresponds to a composition of a network address and of a resource identifier indicated by an access path. In this case, it may be sufficient to obtain a network address for the central control unit U.

The different home automation devices are then associated to different resources corresponding to distinct access paths. As example, considering an OIC/Iotivity type protocol, by obtaining for the central control unit an address 192.168.0.2, it is possible to assign the identifiers of two lighting-type devices as follows:

oc://192.168.0.2:1234/light/1 oc://192.168.0.2:1234/light/2

The resource /light/1 is assigned to the first lighting-type device. The resource /light/2 is assigned to the second lighting-type device.

Variant

According to one variant, the step of obtaining the location identifier may correspond to a reception of an input by the user of a location identifier according to the second communication protocol as represented in FIG. 4 by step ECfU2'.

According to one variant, the step of receiving a configuration message comprises a declaration by the user of the location identifier according to the first communication protocol and/or a declaration by the user of at least one function or of a device type according to the first communication protocol as represented in FIG. 4 by step ECfU2'.

Discovery Method

First Implementation

Figure 7:
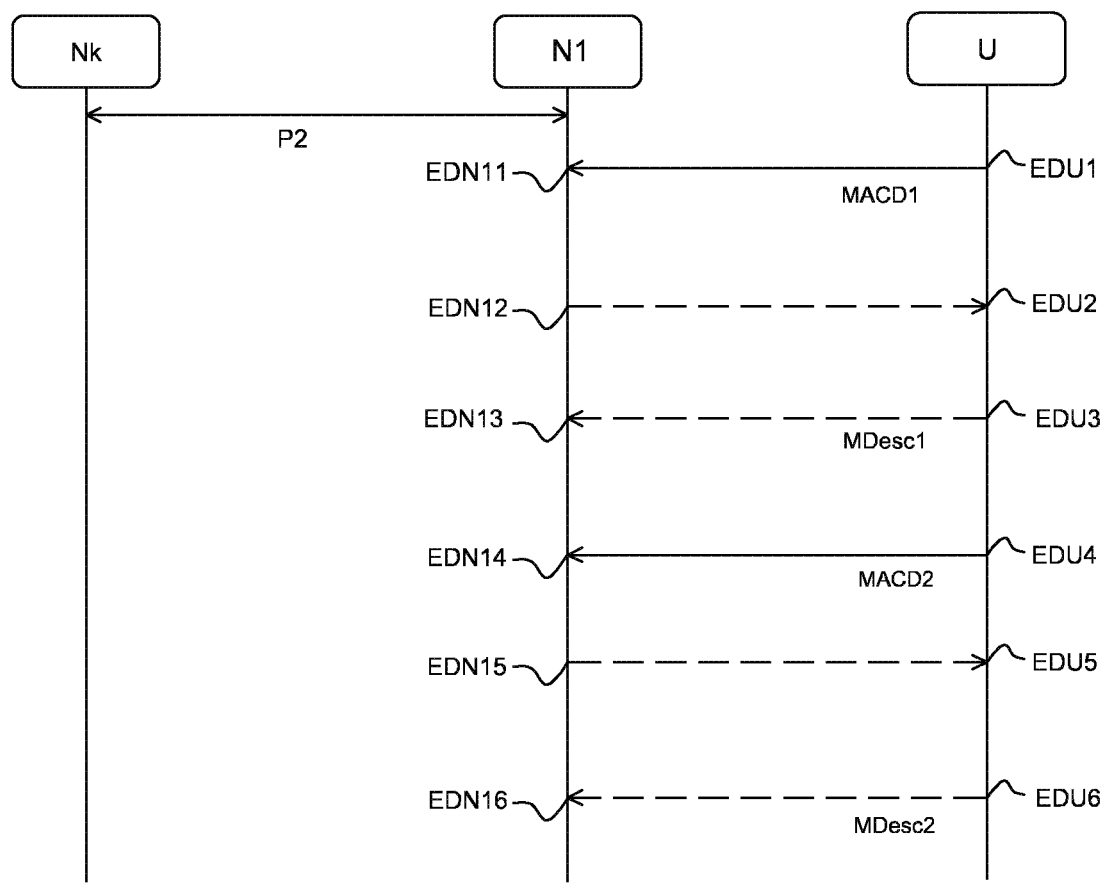
FIG. 7 is a diagram illustrating a first implementation of a discovery method of a home automation installation according to the invention.

We will now describe a first embodiment of a discovery method of a home automation installation 17 with reference to FIG. 7. We will assume herein that the configuration method as described in FIG. 4 has been executed beforehand, so as to obtain the configuration represented in FIG. 3.

The method is executed by the central control unit U. Only two nodes N1, Nk communicating according to the target second communication protocol P2 on the network R2 are represented in FIG. 7. Nonetheless, one single node or more than two nodes may also be considered.

At a step EDU1, the central control unit U sends a compliance announcement MACD1 or existence declaration message in connection with a location identifier P2AD1, of a first home automation device D1 to at least one node N1 communicating according to the target communication protocol P2. The location identifier P2AD1 of the at least one home automation device D1 according to the second communication protocol P2 corresponds to the identifier P1AD1 of the home automation identifier D1 according to the first communication protocol P1. The correspondence between the identifiers P1AD1 and P2AD1 is stored in a nodes table inputted during the configuration method.

Next, at a step EDU2, the central control unit U receives a discovery message MD, emitted by a node according to the second communication protocol P2 at a step EDN12.

At a step EDU3, the central unit sends a description message MDesc1 according to the target second communication protocol P2 in connection with a type P2TD1 of the home automation device D1 or at least one description of a function P2F1D1, P2F2D1 or of a group of functions according to the second communication protocol P2 and/or of at least one state variable P2S1D1, P2S2D1 or of a group of state variables of the home automation device D1 according to the second communication protocol P2.

The same steps EDU4 to EDU6, corresponding to the steps EDU1 to EDU3, are repeated for the second home automation device D2.

Thus, at a step EDU4, the central unit sends a compliance announcement message MACD2 in connection with a location identifier P2AD2 of the second home automation device D2 to at least one node N1 communicating according to the target communication protocol P2. The location identifier P1AD2 of the home automation device D2 according to the first communication protocol corresponds to the location identifier P2AD2 of the at least one home automation device D2 according to the second communication protocol P2. The correspondence between the identifiers P1AD2 and P2AD2 is stored in a nodes table inputted during the configuration method.

Next, at a step EDU5, the central control unit U receives a discovery message MD, emitted by a node according to the second communication protocol P2 at a step EDN15.

At a step EDU6, the central unit sends a description message MDesc2 according to the target second communication protocol P2 in connection with a type P2TD2 of the home automation device D2 or at least one description of a function P2F1D2, P2F2D2 according to the second communication protocol P2 and/or of at least one state variable P2S1D2, P2S2D2 of the home automation device D2 according to the second communication protocol P2.

Thus, the publication of a location identifier according to the target second communication protocol is carried out for home automation devices D1, D2 which can communicate only but according to a local or proprietary first protocol.

According to one variant, the compliance announcement message MACD1, MACD2 and the description message MDesc1, MDesc2 may be combined and sent without waiting for the reception of a discovery message.

According to one variant, the compliance announcement message MACD1, MACD2 and/or the description message MDesc1, MDesc2 may be sent periodically to the nodes of the network R2.

Second Implementation

Figure 8:
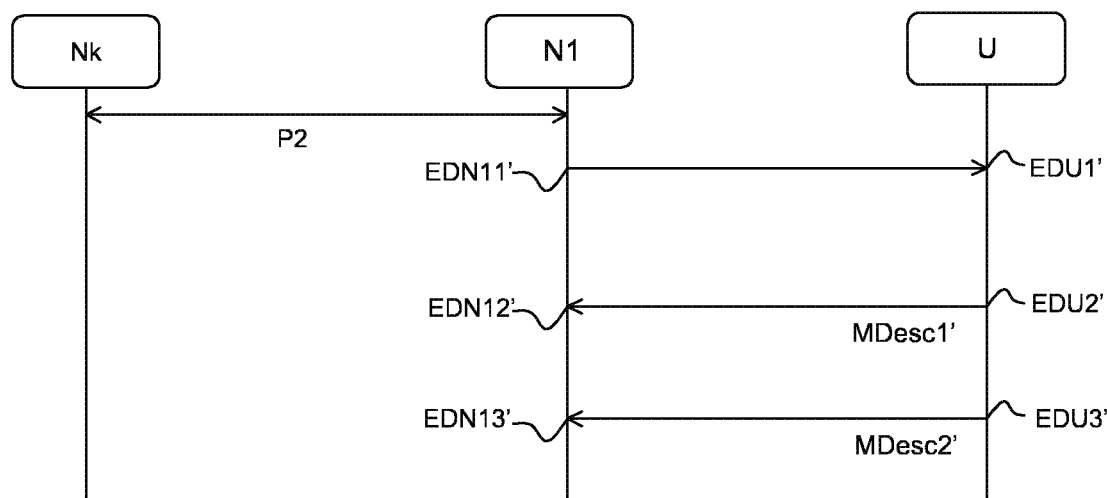
FIG. 8 is a diagram illustrating a second implementation of a discovery method of a home automation installation according to the invention.

According to a variant of the discovery method described in FIG. 8, the central control unit waits at a step EDU1' for the reception of a discovery message MD' according to the second communication protocol P2 emitted by a node N1 at a step EDN11' to send a first compliance announcement and description message MDesc1' at a step EDU2' according to a target second communication protocol P2 in connection with the location identifier P1AD1 of the first home automation device D1 and comprising:
 a type P2TD1 of the home automation device D1, or
 at least one description of a function P2F1D1, P2F2D1 according to the second communication protocol P2, and/or
 at least one description of a state variable P2S1D1, P2S2D1 of the home automation device D1 according to the second communication protocol P2.

In the same manner, the central control unit sends at a step EDU3' a second compliance announcement and description message MDesc2' according to the target second communication protocol P2 in connection with the location identifier P1AD2 of the first home automation device D2 and comprising:
 a type P2TD2 of the home automation device D2, or
 at least one description of a function P2F1D2, P2F2D2 according to the second communication protocol P2, and/or
 at least one state variable P2S1D1, P2S2D1 of the home automation device D1 according to the second communication protocol P2.

In this implementation, the compliance announcement and description messages are combined. They may also be distinct from each other as in the first implementation.

Variant

According to one variant, the central control unit U may periodically check-up the availability of the home automation devices and send description and/or existence declaration messages only in case of availability of the concerned home automation device.

Control Method

First Implementation

Figure 9:
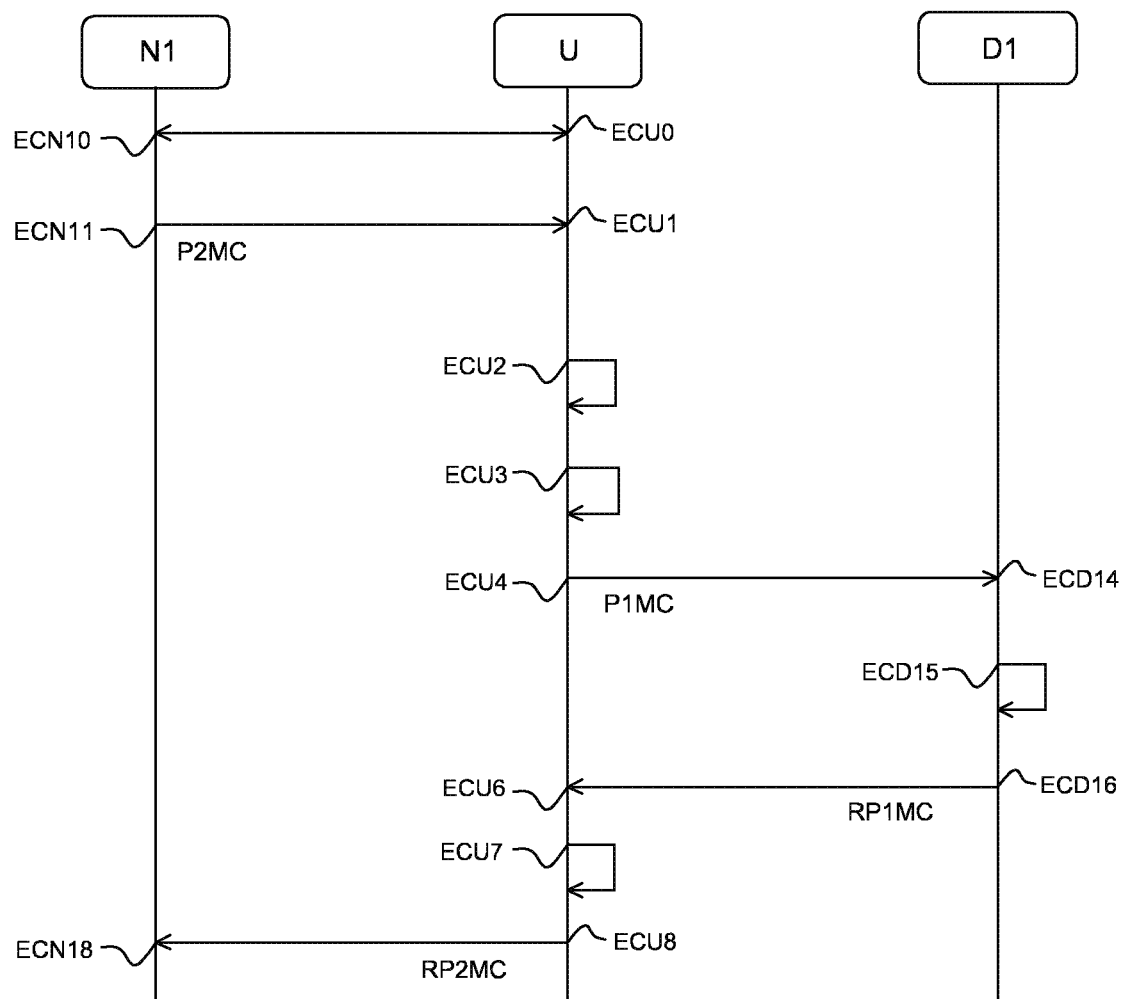
FIG. 9 is a diagram illustrating an implementation of a control method of a home automation installation according to the invention.

We will now describe a first embodiment of a control method of a home automation installation 17 with reference to FIG. 9. We will assume herein that the configuration method as described in FIG. 4 has been executed beforehand, so as to obtain the configuration represented in FIG. 3. We will assume that a discovery method as described in FIG. 7 or FIG. 8 has also been executed.

The control method is executed by the central control unit U. Only one node N1 communicating according to the target second communication protocol P2 on the network R2 is represented in FIG. 9. Nonetheless, one single node or more than two nodes may also be considered. In the same manner, only one home automation device D1 communicating according to the local first protocol P1 is represented but other devices may be present.

At an optional prior step ECU0, a connection may be established between the node between a node N1 communicating according to the second communication protocol P2 and the central control unit U, the central control unit U acting on the network R2 as a virtual representative of the home automation devices of the network R1 communicating according to the local first communication protocol P1.

At a first step ECU1, the central control unit U receives at least one control message P2MC originating from a node N1 communicating according to the second communication protocol P2. The control message P2MC which is emitted by the node N1 at a step ECN11 comprises at least one location identifier P2AD1 of a home automation device D1 according to the target second communication protocol P2 and at least one definition of a function P2F1D1 of the home automation device D1 according to the second communication protocol P2. In this instance, we will assume that the device concerned by the command is the device D1 identified by the location identifier P2AD1, and that the concerned function is a function P2F1D1 intended to this single home automation device.

At a step ECU2, the central control unit U determines a location identifier P1AD1 of the home automation device D1 according to the first communication protocol corresponding to the location identifier P2AD1 of the at least one home automation device D1 according to the second communication protocol P2 received in the control message P2MC.

At a step ECU3, the central control unit applies a function conversion rule RCFX arranged to convert the definition of the function P2F1D1 according to the target second communication protocol P2 into at least one definition of a function P1F1D1 according to the local first communication protocol P1. For this purpose, the central control unit U may use the correspondence table inputted during the configuration method.

The step of applying a conversion rule may comprise the completion of processing steps complementary to the command call, in particular if a portion of the function cannot be carried out on the home automation device, and in particular a partial enrichment of the function, or still the restriction of the requested function or the banning of a function to be carried out.

As example, a planning of a command may be provided if the device itself does not enable such a planning. Thus, it is possible to implement on the central control unit a «Calendar Weave» type function in order to trigger an opening command on Monday at 8.00 AM for an awning-type home automation device. Also as example, a parameter conversion may be carried out by the central control unit.

At a step ECU4, the central control unit U sends at least one control message P1MC to the at least one home automation device D1 corresponding to the location identifier P1AD1 and to the function P1F1D1 according to the local first communication protocol P1.

At a step ECD15, the home automation device D1 executes the function P1F1D1.

At a step ECU6, the central control unit U receives ECU6 a control feedback message RP1MC emitted by the home automation device D1 at a step ECD16 according to the local first communication protocol P1.

At a step ECU7, the central control unit U applies a function conversion rule RCFX in order to convert a control feedback information P1RC expressed according to the local first communication protocol P1 into a control feedback information P2RC expressed according to the target second communication protocol P2.

At a step ECU8, the central control unit U emits at least one control feedback message RP2MC to the node N1 comprising a control feedback information P2RC according to the target second communication protocol P2.

Variants

According to one variant, the central control unit U may receive a control message P2MC corresponding to a grouped command intended to a set of home automation devices identified by a set of location identifiers. In this case, a plurality of control messages P1MC are sent to the concerned control devices, after conversion of the concerned function and the location identification for each device. Next, the central control unit may optionally aggregate the results or feedback communicated by the home automation devices D so as to return a unique control feedback message P2RC. As example, it may be agreed that the command is considered to be successfully completed if all completions of individual functions have a positive feedback, or to have failed if one of the functions for a home automation device returns a failure value.

According to another variant already mentioned in the context of the configuration method, a group of devices may be identified by the same location identifier according to the second protocol. In this case, the correspondence table comprises several location identifiers according to the first communication protocol which correspond to the same location identifier according to the second communication protocol. In this case, it is possible to proceed as previously mentioned for the grouped command. A plurality of functions according to the local first communication protocol is sent to the concerned devices corresponding to the plurality of location identifiers according to the first communication protocol, and then the feedbacks are stored and then aggregated so as to return one single result for the considered control message.

Supervision Method

Figure 10:
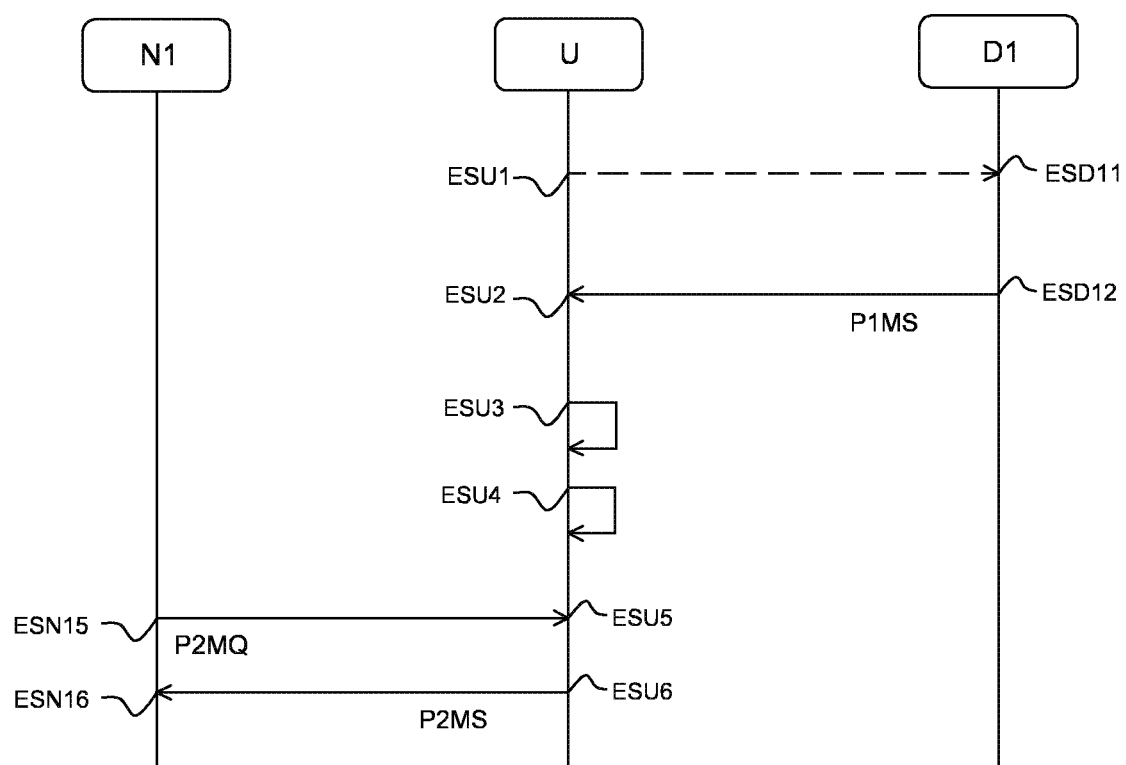
FIG. 10 is a diagram illustrating an implementation of a supervision method of a home automation installation according to the invention.

We will now describe a first embodiment of a supervision method of a home automation installation 17 with reference to FIG. 10. We will assume herein that the configuration method as described in FIG. 4 has been executed beforehand, so as to obtain the configuration represented in FIG. 3. We will assume that a discovery method as described in FIG. 7 or FIG. 8 has also been executed.

The supervision method is executed by the central control unit U. Only one node N1 communicating according to the target second communication protocol P2 on the network R2 is represented in FIG. 10. Nonetheless, one single node or more than two nodes may also be considered. In the same manner, only one home automation device D1 communicating according to the local first protocol P1 is represented but other devices may be present.

At a step ESU2, the central control unit receives a supervision message P1MS emitted by a home automation device D1 at a step ESD12, the supervision message P1MS comprising an information relating to a value of at least one state variable P1S1D1 of the at least one home automation device D1 according to the first communication protocol P1. The step ESU2 may be subsequent to a first step ESU1 of sending an interrogation or polling message, received by the home automation device D1 at a step ESD11. Alternatively, sending of the message P1MS may be autonomously initiated by the home automation device D1, for example by detecting an event modifying the value of a state variable P1S1D1.

Sending of the message P1MS may be indifferently carried out to a set of nodes present on the network communicating according to the first communication protocol. This arrangement corresponds to a mode called «Broadcast» mode. According to an alternative implementation, the home automation device may send the supervision message only to the nodes subscribed on the network established according to the first communication protocol, and in particular to the central control unit if the latter is subscribed. In this case, the central unit carries out a prior step of sending to a home automation device D1 a request for registration in a subscription list to an event relating to the at least one state variable P1S1D1 of the home automation device D1.

At a step ESU3, the central control unit applies a state conversion rule RCSX in order to convert the at least one information relating to a value of at least one state variable P1S1D1 of the at least one home automation device D1 expressed according to the local first communication protocol P1 into a value of at least one state variable P2S1D1 of the home automation device D1 expressed according to the target second communication protocol P2.

At a step ESU4, the central control unit adapts the location identifier P1AD1 of the at least one home automation device P1AD1 according to the first communication protocol P1 into a location identifier P2AD1 of the home automation device P2AD1 according to the second communication protocol P2. The steps ESU3 and ESU4 of applying a conversion rule and of address adaptation may be carried out sequentially in any order or simultaneously.

At a step ESU6, the central control unit sends a supervision message P2MS to the node N1 communicating according to a second communication protocol P2, the supervision message P2MS comprising an information relating to a value of at least one state variable P2S1D1 of the home automation device D1 according to the target second communication protocol P2 and in connection with the location identifier P2AD1 of the home automation device D1 according to the second communication protocol P2.

According to one possibility, sending of the supervision message P2MS may be carried out on the initiative of the central control unit U spontaneously or upon reception of a supervision message P1MS originating from a home automation device D1. According to another possibility, the supervision message P2MS may be sent upon reception by the central control unit U at a step ESU5 of a request message MQ emitted at a step ESN15 originating from a node N1 of the network R2. According to this second possibility, the central control unit U comprises a space or base for storing the values of state variables for the home automation devices related thereto.

In the context of a direct sending on the initiative of the central unit U, sending of the supervision message P2MS may be indifferently carried out to a set of nodes present on the network communicating according to the second communication protocol P2. This arrangement corresponds to a mode called «Broadcast» mode. According to an alternative implementation, the central control unit may send the supervision message only to the nodes of the network R2 registered in a subscription list, and in particular to the node N1. In this case, the node N1 carries out a prior step of sending to the central control unit U a request for registration in a subscription list to an event relating to the at least one state variable P2S1D1 of the home automation device D1.

Variant

According to one variant, the supervision method may be adapted to a control point. In this case, the command is identified and is notified to the central control unit as a modification of a state variable.

According to one variant, the aforementioned polling step ESU1 allows implementing an event-based emulation for a device that does not offer such a feature, in which the central control unit U may periodically consult the values of state variables of the devices, detect the modifications on the values of state variables by comparing the last obtained value and the datum(data) that it has stored before and send, in case of modification, a supervision message P2MS relating to the modified state variable to a node N1 subscribed to the modifications of this state variable.

EXAMPLES

Example 1

A first example concerns a temperature sensor type home automation device D1. This sensor communicates according to an io-Homecontrol type local first protocol P1 and is intended to be made accessible as a sensor according to the Bluetooth Low Energy type second communication protocol P2.

During the process of configuring or pairing the io-Homecontrol sensor to the central control unit U, in the configuration message MCfD1, the home automation device D is described as a 0x03 (outside temperature sensor, unit: ° K) type system IO sensor with a location identifier in the form of a network address IO 0x485670.

The central control unit is subscribed with the home automation device D (IO sensor) so as to receive events relating to the variation of the measured temperature, which corresponds to a state variable P1S1D1 of the device.

Afterwards, the central control unit proceeds with the automatic determination of a standard Bluetooth type or profile to use in order to publish this device by using a correspondence table. In particular, the identified corresponding profile is «Service Environmental Sensing» (org.bluetooth.service.environmental_sensing/0x181A) with a published state variable definition «Temperature (org.bluetooth.characteristic.temperature/0x2A6E) according to a unit: ° C. (entire/resolution 0.01).

Afterwards, the central control unit proceeds with the determination of a location identifier P2D1A of a free Bluetooth address for the corresponding device at step ECfU6. In particular, this network address may be constituted by 5 first static bytes corresponding for example to a manufacturer prefix and to a number or identifier of the central control unit U, and to a free bye whose value identifies the device D1. For example, the central control unit may choose the address 00:12:34:56:78:01.

The central control unit U proceeds at a step ECfU7/ ECfU8 with the registration of the correspondence of the device type according to the first and second protocol P2 and of the correspondence of the location identifiers according to the first and second protocol in the nodes table.

Afterwards, the discovery method is implemented.

At a first step EDU1, the central control unit U sends an announcement MACD1 and description MDesc1 message of the home automation device D1 in the form of a new virtual device according to the second communication protocol P2 on the Bluetooth network R2.

In the case of a Bluetooth protocol, the central control unit U may implement a GATT (Generic Attribute Profile) Bluetooth server which announces the device D1 at regular intervals.

On reception of such a message, a node N1 constituting a Bluetooth client, for example a phone or a tablet, may then establish a point-to-point connection with the central control unit U in order to pilot or receive data from the virtual device.

Afterwards, the supervision or control method may be implemented.

Thus, when a radio IO event emitted by the sensor is received by the central control unit originating from a location identifier according to the first communication protocol P1 (herein an address IO 0x485670), the latter determines the corresponding location identifier according to the second communication protocol P2 by using the nodes table. In the considered example, the returned address is, in this instance, Bluetooth 00:12:34:56:78:01.

At a step ESU3, the central control unit U determines whether the temperature state variable P1S1D1 possesses a correspondence in the Bluetooth profile of the virtual device and the possible conversion function. In the considered example, the temperature state variable in Kelvin degrees of the home automation device D1 may be mapped on a notification related to the state variable P2S1D1 or characteristic «Temperature» of the service «Environmental Sensing» emulated according to the second communication protocol P2.

The central control unit U applies the following conversion function which corresponds to a conversion into Celsius degrees and into an integer value with a 0.01 accuracy:

$$T \rightarrow \text{floor}((T-273.15)*100).$$

Afterwards, the central control unit U sends a supervision message P2MS in the form of a Bluetooth notification to the connected node N1 with the new temperature value P2S1D1.

According to a variant using the control method, an active reading of the temperature may be carried out.

In this case, the node N1 which is a Bluetooth client paired with the virtual device sends a read request regarding the state variable or characteristic «Temperature» of the service «Environmental Sensing» of the virtual device, at a step ESN15.

The central control unit may respond by using the last value received from the IO sensor or send a command to the device in order to obtain this value which is stored by the central control unit U.

Example 2

A second example concerns a dimmable lamp type home automation device D1 according to a ZWave type local first communication protocol P1 intended to be published as a «dimmer.lamp» type resource in a OIC/lotivity type target second protocol P2 on an IP-type network R2.

During the process of configuring or pairing the ZWave lamp to the central control unit U, in the configuration message MCfD1, the home automation device D is described as a «Light Dimmer» type device with a location identifier P1D1A corresponding to the address ZWave 26 which possesses a definition of a group of functions («cluster fonctionnel») «SWITCH_MULTILEVEL_V3» corresponding to a setting of an intensity level.

The central control unit U is subscribed with the home automation device so as to receive a notification on a change of a state or of a state variable describing the operating state («report»).

The central control unit U determines a device type or profile according to the target second protocol P2 lotivity to be used to publish this device by using a correspondence table. In particular, the identified corresponding resource profile or type is «oic.r.light.dimming» having a proportional lighting control value comprised between 0 and 100%.

Afterwards, the central control unit determines a location identifier P2D1A according to the second communication protocol. The target second communication protocol P2 does not necessarily require a different network address for each device. Thus, it is possible to use a unique network address, for example the IP address of the home automation controller (ex: 192.168.0.2).

In order to construct the location identifier of the virtual device, that is to say in this case a URL according to the target second protocol lotivity, the central control unit U proceeds with the selection of a resource number that has not yet been assigned by this central control unit U starting from 1 and then combines this element with the IP address so as to obtain for example the following URL:

*oc://192.168.0.2:1234/light/1.*

At a step ECfU7/ECfU8, the central control unit U proceeds with the registration of the correspondence of the device type according to the first and second protocol P2 and of the correspondence of addresses according to the first and second protocol in a nodes table.

The central control unit U also proceeds with a registration or a declaration of the resource in the lotivity server software executed thereby, the software being active in standby on the address 192.168.0.2 at the port 1234.

Afterwards, the discovery method may be implemented.

The declared virtual device D1 may be discovered by a standard lotivity client executed by a node N1 by using a multicast discovery request which corresponds to a discovery message MD.

Afterwards, the supervision or control method may be implemented.

In the context of a control method, a lotivity client or node N1 having discovered the virtual home automation device D1 can then control the device D1 by sending a control message P2MC in the form of a request «CoAP PUT» regarding the property «dimmingSetting» of the resource identified by the location identifier P2D1A according to the second communication protocol P2 «oc://192.168.0.2:1234/light/1».

In this case, the lotivity server of the central control unit U receives the control message P2MC and then determines the location identifier P1D1A according to the corresponding first communication protocol P1, in the considered example «ZWave 26» by using the nodes table.

The central control unit also determines the command or function conversion function (lotivity→ZWave) and then constructs and sends a control message P1MC in the ZWave format to the home automation device D1.

Afterwards, depending on the response P1RC of the home automation device D1 to the command, the central unit can respond to the control message P2MC by a control feedback message P2RC corresponding to a success or to a failure of the command or function call.

According to an example of the supervision method, the node N1 may consult the value of a current state variable of the home automation device D1 by sending a control message P2MC in the form of a request «CoAP GET» regarding the resource identified by the location identifier P2D1A according to the second communication protocol P2 «oc://192.168.0.2:1234/light/1».

In this case, the lotivity server of the central control unit U receives the control message P2MC and then determines the location identifier P1D1A according to the corresponding first communication protocol P1, in the considered example «ZWave 26» by using the nodes table.

Next, the central control unit U determines the state variable(s) P1S1D1, P1S2D1 according to the local first communication protocol P1 ZWave to be sent back, for example the last value received from the «cluster SWITCH_MULTILEVEL_V3» and the possible conversion functions, and in particular the name of the state variable in the target second communication protocol lotivity, namely in the present example the property «dimmerSetting».

Afterwards, the central control unit U may convert the value with the so conversion function and respond to the request CoAP with the obtained value.

The invention claimed is:

1. A configuration method of a home automation installation comprising at least one home automation device and at least one central control unit, the at least one home automation device being prone to communicate with the at least one central control unit via at least one local first communication protocol; the method being executed by the at least one central control unit and comprising the following steps:

reception of at least one configuration message relating to a location identifier of the at last one home automation device according to the at least one local first communication protocol and to:

at least one definition of a state variable or of a group of state variables of the at least one home automation device according to the at least one local first communication protocol;

obtainment of a location identifier of the at least one home automation device according to a target second communication protocol;

registration of correspondence between the location identifier of the at least one home automation device according to the at least one local first communication protocol and the location identifier of the at least one home automation device according to the target second communication protocol; and registration of the at least one definition of a function or of a group of functions of the at least one home automation device and/or of the at least one definition of a state variable or of a group of state variables of the at least one home automation device; and/or of a function conversion rule arranged to convert the at least one definition of the function or the group of functions according to the at least one local first communication protocol into at least one definition of a function or of a group of functions according to the target second communication protocol and/or of a state conversion rule arranged to convert the at least one definition of the state variable according to the at least one local first communication protocol into at least one definition of a state variable according to the target second communication protocol.

2. The configuration method according to claim 1, further comprising the following steps:

obtainment of at least one function conversion rule arranged to convert the at least one definition of the function according to the at least one local first communication protocol into at least one definition of a function according to the target second communication protocol and/or of a state conversion rule arranged to convert the at least one definition of the state variable according to the at least one local first communication protocol into at least one definition of a state variable according to the target second communication protocol, registration of the at least one function conversion rule and/or of the at least one state conversion rule.

3. The configuration method according to claim 1, further comprising the following step:

definition of an action to carry out at least partially by the central control unit in correspondence with a function according to the target second communication protocol corresponding to the location identifier.

4. The configuration method according to claim 1, wherein a conversion step comprises restriction of a requested function or banning of a command/function to be carried out.

5. The configuration method according to claim 2, further comprising the following step:

definition of an action to carry out at least partially by the central control unit in correspondence with a function according to the target second communication protocol corresponding to a location identifier.

6. The configuration method according to claim 5, wherein a conversion step comprises restriction of a requested function or banning of a command/function to be carried out.

7. The configuration method according to claim 2, wherein a conversion step comprises restriction of a requested function or banning of a command/function to be carried out.

8. The configuration method according to claim 3, wherein a conversion step comprises restriction of a requested function or banning of a command/function to be carried out.

9. The configuration method according to claim 1, wherein the reception of at least one configuration message relates to a type of the at least one home automation device.

10. The configuration method according to claim 1, wherein the reception of at least one configuration message relates to a at least one definition of a function or of a group of functions of the at least one home automation device according to the at least one local first communication protocol.

11. The configuration method according to claim 1, further comprising the step of:

registration of at least one type of the at least one home automation device according to the at least one local first communication protocol into at least one definition of a function or of a group of functions according to the target second communication protocol and/or of a state conversion rule arranged to convert the at least one definition of the state variable according to the at least one local first communication protocol into at least one definition of a state variable according to the target second communication protocol.

* * * * *